United States Patent
Yamaji

(10) Patent No.: US 10,491,316 B2
(45) Date of Patent: Nov. 26, 2019

(54) DIGITAL BROADCAST RECEIVER

(71) Applicant: Mitsubishi Electric Corporation, Tokyo (JP)

(72) Inventor: Shigehiro Yamaji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/089,259

(22) PCT Filed: May 2, 2016

(86) PCT No.: PCT/JP2016/063569
§ 371 (c)(1),
(2) Date: Sep. 27, 2018

(87) PCT Pub. No.: WO2017/191675
PCT Pub. Date: Nov. 9, 2017

(65) Prior Publication Data
US 2019/0115991 A1     Apr. 18, 2019

(51) Int. Cl.
*H04B 1/16*    (2006.01)
*H04H 40/18*   (2008.01)
*H04H 60/12*   (2008.01)

(52) U.S. Cl.
CPC ............ *H04H 40/18* (2013.01); *H04B 1/16* (2013.01); *H04H 60/12* (2013.01)

(58) Field of Classification Search
CPC .......... H04B 1/16; H04B 1/18; H04B 1/006; H04M 1/72533; H04W 4/008; H04W 16/14; H04H 20/22; H04H 20/42; H04H 40/12; H04H 40/18; H04H 60/12
See application file for complete search history.

(56) References Cited

U.S. PATENT DOCUMENTS

| | | | | |
|---|---|---|---|---|
| 9,647,746 | B1 * | 5/2017 | Iwase | H04B 7/084 |
| 2006/0248412 | A1 * | 11/2006 | Cho | H04H 40/18 |
| | | | | 714/704 |
| 2009/0141838 | A1 * | 6/2009 | Han | H04W 36/06 |
| | | | | 375/344 |

(Continued)

FOREIGN PATENT DOCUMENTS

| | | |
|---|---|---|
| EP | 2 884 680 A1 | 6/2015 |
| JP | 2004-23398 A | 1/2004 |

(Continued)

*Primary Examiner* — Thanh C Le
(74) *Attorney, Agent, or Firm* — Birch, Stewart, Kolasch & Birch, LLP.

(57) ABSTRACT

When the reception level of a main tuner (3) is equal to or lower than a first threshold or the reception level of a sub tuner (4) is equal to or lower than a second threshold while the sub tuner (4) performs data service reception, a sub tuner processing control unit (90), a broadcast program search control unit (91), and a data service control unit (93) cause the sub tuner (4) to suspend the running data service reception and start a broadcast program search. Then, while the reception level of the main tuner (3) is equal to or lower than the first threshold or the reception level of the sub tuner (4) is equal to or lower than the second threshold, the sub tuner processing control unit (90) and the broadcast program search control unit (91) cause the sub tuner (4) to repeatedly and continuously perform a broadcast program search.

4 Claims, 7 Drawing Sheets

(56) References Cited

U.S. PATENT DOCUMENTS

| | | | | |
|---|---|---|---|---|
| 2011/0134327 A1* | 6/2011 | Kaneko | ............... | H04N 5/4401 |
| | | | | 348/569 |
| 2013/0136212 A1* | 5/2013 | Shirasuka | ............... | H04L 27/00 |
| | | | | 375/340 |

FOREIGN PATENT DOCUMENTS

| JP | 2005-117226 A | 4/2005 |
|---|---|---|
| JP | 2007-214734 A | 8/2007 |
| JP | 2013-201682 A | 10/2013 |
| JP | 2015-115906 A | 6/2015 |

* cited by examiner

DIGITAL BROADCAST RECEIVER

TECHNICAL FIELD

The present invention relates to a digital broadcast receiver that is mounted in a moving object and receives a digital broadcast.

BACKGROUND ART

In a digital broadcast receiver that is mounted in a moving object and that receives a broadcast program and data service while moving together with the moving object, broadcast stations from which the digital broadcast receiver can receive programs change depending on the movement, and the digital broadcast receiver is not always in a state in which its reception state is stable at all times. For this reason, there has been provided a digital broadcast receiver that includes a sub tuner in addition to a main tuner, thereby searching for receivable programs by using the sub tuner, and updating a list of programs which can be watched or listened to. By using such a sub tuner, it becomes possible to, for example, during the reception of a program by the main tuner, select, in advance, a broadcast station providing the same program broadcast at a frequency different from that of the program, i.e., a so-called alternative program, seamlessly switch to the alternative program, and receive data service of one or more programs.

However, one sub tuner cannot perform plural operations simultaneously. For example, in order to receive data service of a program, it is necessary to continue selecting a corresponding broadcast station, and thus it is impossible to select another broadcast station in the meantime. Therefore, during the reception of data service, it is impossible to perform a broadcast program search and the channel selection of a broadcast station broadcasting an alternative program. More specifically, during the reception of data service, it is impossible to provide the user with an update in real time of the program list and seamless switching to an alternative program.

Therefore, it is desirable to implement an efficient broadcast program search, alternative station channel selection, and data service reception by controlling the performance of these operations of the sub tuner including the broadcast program search, the alternative station channel selection, and the data service reception in accordance with the state.

For example, Patent Literature 1 discloses a dual-tuner radio receiver in which, when the received field strength of a main tuner means a strong electric field, a sub tuner is used exclusively for Vehicle Information and Communication System (VICS, registered trademark/this description will be omitted hereafter) reception, when the strength means an intermediate electric field, the sub tuner performs time division processing of network follow reception and VICS reception, when the strength means a weak electric field, the sub tuner is used exclusively for network follow reception, and when the strength means a very weak electric field, the sub tuner is used exclusively for VICS reception.

CITATION LIST

Patent Literature

Patent Literature 1: Japanese Unexamined Patent Application Publication No. 2004-23398

SUMMARY OF INVENTION

Technical Problem

As mentioned above, in the dual-tuner radio receiver of Patent Literature 1, when the electric field strength means a very weak electric field, the sub tuner does not perform network follow, but is used exclusively for VICS reception.

However, even in such a very weak electric field, the necessity for broadcast program search is high because receivable broadcast stations can change due to bad radio wave condition of the broadcast station currently being received. Further, when the received field strength of the sub tuner is low, missing of data can occur due to an unstable reception state, and thus the success rate of data service reception is low. Therefore, in the case of using control such as the control by the dual-tuner radio receiver of Patent Literature 1, it is difficult to say that an efficient broadcast program search, alternative station channel selection, and data service reception are made possible.

The present invention is made in order to solve the above-mentioned problem, and it is therefore an object of the present invention to provide a digital broadcast receiver that makes an efficient broadcast program search, alternative station channel selection, and data service reception possible.

Solution to Problem

According to the present invention, there is provided a digital broadcast receiver for moving object including: two tuners; and a control unit for performing control to, while causing one of the tuners to select a broadcast station broadcasting a program currently being provided for a user, cause another one of the tuners to perform a broadcast program search to search for a receivable program, alternative station channel selection to select a broadcast station broadcasting a program as an alternative to the program currently being provided for the user, or data service reception to receive data service of a receivable program, in which, when there occurs a state in which a reception level of the one of the tuners is equal to or lower than a first threshold or a reception level of the other one of the tuners is equal to or lower than a second threshold while the other one of the tuners performs data service reception, the control unit causes the other one of the tuners to suspend the data service reception and continuously perform a broadcast program search during the state, and, when the state is canceled, the control unit causes the other one of the tuners to start a process of performing a broadcast program search, then alternative station channel selection, and then data service reception.

Advantageous Effects of Invention

According to the present invention, because when there occurs a state in which the reception level of the one of the tuners is equal to or lower than the first threshold or the reception level of the other one of the tuners is equal to or lower than the second threshold while the other one of the tuners performs data service reception, the other one of the tuners is caused to suspend the data service reception and continuously perform a broadcast program search during the state, an efficient broadcast program search, alternative station channel selection, and data service reception are made possible.

DESCRIPTION OF EMBODIMENTS

Hereafter, in order to explain this invention in greater detail, an embodiment of the present invention will be described with reference to the accompanying drawings.
Embodiment 1

Figure 1:
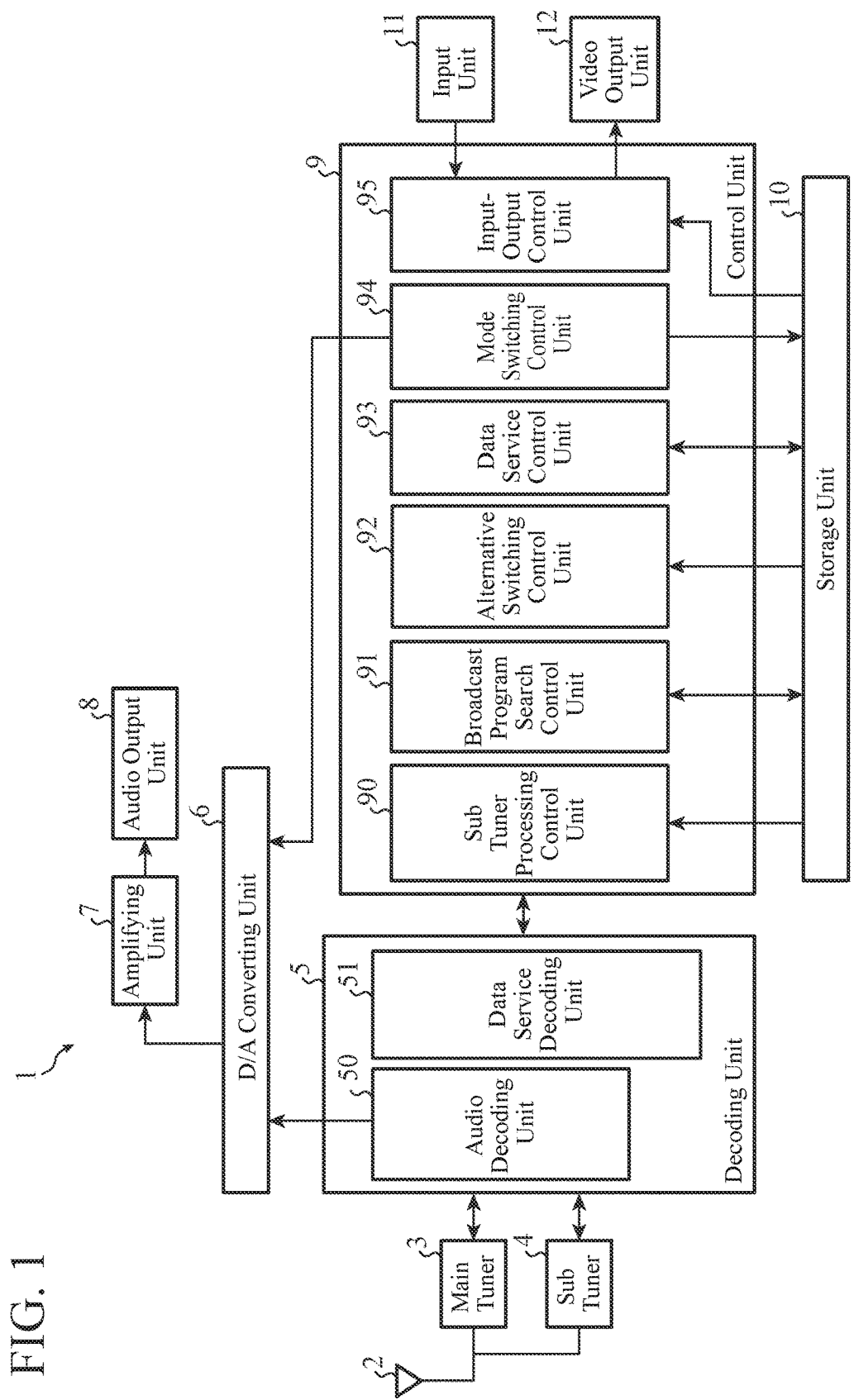
FIG. 1 is a diagram showing the configuration of a digital broadcast receiver according to Embodiment 1 of the present invention.

The configuration of a digital broadcast receiver 1 according to Embodiment 1 of the present invention is shown in FIG. 1. The digital broadcast receiver 1 is mounted in, for example, a moving object such as a vehicle. Hereafter, an explanation will be made by taking, as an example, a case in which the digital broadcast receiver 1 receives a digital radio broadcast compliant with a Digital Audio Broadcast (DAB) method.

The digital broadcast receiver 1 includes an antenna 2, a main tuner 3, a sub tuner 4, a decoding unit 5, a D/A converting unit 6, an amplifying unit 7, an audio output unit 8, a control unit 9, a storage unit 10, an input unit 11, and a video output unit 12.

The antenna 2 receives a broadcast wave of a digital broadcast, and outputs a reception signal to the main tuner 3 and the sub tuner 4.

The main tuner 3 selects a signal corresponding to a broadcast station broadcasting a program provided for a user from the reception signal outputted by the antenna 2, and outputs the selected signal to the decoding unit 5. Hereafter, outputting an image or an audio of a program or the like from, for example, the audio output unit 8 or the video output unit 12 in such a way as to enable the user to watch or listen to the program or the like is referred to as "providing the program or the like for the user."

The sub tuner 4 performs various types of processes, which will be mentioned later, by using the reception signal outputted by the antenna 2, and outputs processing results and so on to the decoding unit 5 as a signal.

The main tuner 3 and the sub tuner 4 have the same functions, as will be mentioned later, and one of the tuners and the other one of them are caused to function as a main one and as a sub one in a switchable manner by the control unit 9.

The decoding unit 5 includes an audio decoding unit 50 and a data service decoding unit 51. The audio decoding unit 50 decodes audio data acquired from the signal outputted by the main tuner 3. Audio data is outputted to the D/A converting unit 6. The data service decoding unit 51 decodes data about a data service, the data being acquired from each of the signals outputted by the main tuner 3 and the sub tuner 4. Data about a data service is outputted to the control unit 9. The data about a data service shows an icon of a program, an explanatory sentence concerning the program, such as performers, and so on, and can be displayed finally by the video output unit 12 as long as the data is concerned with the program currently being provided for the user.

The D/A converting unit 6 converts the audio data into an analog signal, and outputs this analog signal to the amplifying unit 7.

The amplifying unit 7 amplifies the analog signal outputted by the D/A converting unit 6, and outputs the amplified analog signal to the audio output unit 8.

The audio output unit 8 outputs the audio corresponding to the analog signal outputted by the amplifying unit 7.

The control unit 9 centralizedly controls the operation of each of the units in the digital broadcast receiver 1, and includes a sub tuner processing control unit 90, a broadcast program search control unit 91, an alternative switching control unit 92, a data service control unit 93, a mode switching control unit 94, and an input-output control unit 95.

The sub tuner processing control unit 90 determines a process which the sub tuner processing control unit causes the sub tuner 4 to perform, and notifies the broadcast program search control unit 91, the alternative switching control unit 92, and the data service control unit 93 of the process. Then, the broadcast program search control unit 91, the alternative switching control unit 92, and the data service control unit 93 control the sub tuner 4 in such a way that the sub tuner performs the process determined by the sub tuner processing control unit 90.

The broadcast program search control unit 91 outputs a control signal to the sub tuner 4 via the decoding unit 5, to cause the sub tuner 4 to perform a broadcast program search to search for a receivable program.

In the broadcast program search, the sub tuner 4 sequentially selects a signal of each frequency within a predetermined band from the reception signal outputted by the antenna 2, to acquire program information. The band and each frequency are stored in advance in the storage unit 10, for example, and can be read by the broadcast program search control unit 91. The program information includes a service program name and a service ID, and is outputted from the sub tuner 4, via the decoding unit 5, to the broadcast program search control unit 91 as a search result while being linked with a corresponding frequency. The search result is stored in the storage unit 10 by the broadcast program search control unit 91 as a program list showing receivable programs. When a search result about the predetermined band is acquired, the broadcast program search control unit 91 outputs a control signal to terminate the broadcast program search to the sub tuner 4. Further, the broadcast program search control unit 91 notifies the sub tuner processing control unit 90 that the broadcast program search has been completed.

The alternative switching control unit 92 outputs a control signal to the sub tuner 4 via the decoding unit 5, to cause the sub tuner 4 to perform alternative station channel selection to select an alternative station. The alternative station is a broadcast station broadcasting an alternative program. The alternative program has the same content as the program of the broadcast station selected by the main tuner 3, the program being currently provided for the user, and has a different broadcast frequency.

In the alternative station channel selection, the sub tuner 4 continues selecting an alternative station during at least a predetermined set time period, except when switching to an alternative station, which will be mentioned later, is performed. When starting the alternative station channel selection, the alternative switching control unit 92 reads the program list which is the search result of a broadcast program search from the storage unit 10, thereby providing an instruction indicating a broadcast station which the sub tuner 4 should select, by using a control signal. For example, the alternative switching control unit 92 determines the frequency of the alternative station by using a service ID shown in the program list. This determination uses the fact that the same service ID is assigned to programs having the same content. As an alternative, the alternative switching control unit 92 can select a program having the same service ID as the service ID of an alternative station, a notification of the service ID being provided by the broadcast station currently being selected by the main tuner 3, from the program list. In this case, broadcasting is performed with the service ID of the alternative station being set into FIG Type0/6 of Fast Information Group (FIG) data.

Further, when performing switching to the alternative station, the alternative switching control unit 92 outputs a control signal to the sub tuner 4 via the decoding unit 5, and, after that, causes the sub tuner 4 to operate as the main tuner. At that time, the alternative switching control unit 92 outputs a control signal also to the main tuner 3 via the decoding unit 5, and, after that, causes the main tuner 3 to operate as the sub tuner. More specifically, the alternative switching control unit 92 causes switching between the main tuner and the sub tuner to be performed. When the switching between the main tuner and the sub tuner is performed while the sub tuner 4 performs the alternative station channel selection, seamless switching to the alternative station without a sound skip or the like is possible.

When the set time period elapses after the alternative station channel selection has been caused to be performed, the alternative switching control unit 92 outputs a control signal to terminate the alternative station channel selection to the sub tuner 4. Further, when the switching between the main tuner and the sub tuner is performed while the alternative station channel selection is performed, the alternative switching control unit 92 outputs a control signal to continue the channel selection of the broadcast station which has been selected as the alternative station to the sub tuner 4 which has been switched to the main tuner. Further, when the set time period elapses after the sub tuner 4 has been caused to perform the alternative station channel selection, the alternative switching control unit 92 notifies the sub tuner processing control unit 90 that the alternative station channel selection has been completed. The set time period will be referred to as the alternative station channel selection time period hereafter.

The data service control unit 93 outputs a control signal to the sub tuner 4 via the decoding unit 5, to cause the sub tuner 4 to perform data service reception to receive data service of a receivable program.

In the data service reception, the sub tuner 4 causes the data service decoding unit 51 to decode data about data service accompanying a program detected through the broadcast program search. The decoded data about the data service is outputted from the decoding unit 5 to the data service control unit 93, and the data service control unit 93 causes the storage unit 10 to store this data.

At that time, the data service control unit 93 reads the program list which is the search result of the broadcast program search from the storage unit 10 and also reads information showing whether data about data service has been acquired from the storage unit 10, and causes the sub tuner 4 to perform reception of data service accompanying a program whose data about the data service has not been acquired. For doing this, every time reception of data service accompanying one program is completed, the data service control unit 93 causes the storage unit 10 to store information showing that the data about the data service of the program has been acquired. Further, data about data service has an expiration period as a result of, for example, setting by a broadcaster or a uniform setting of an update time period. The data service control unit 93 causes the storage unit 10 to also store the expiration period of data about the data service which is received. When the expiration period of the data has passed, the data service control unit 93 handles the data about the data service of the program corresponding to the data as yet-to-be-acquired data.

When the reception of data service accompanying one program is completed, the data service control unit 93 outputs a control signal to terminate the reception of the data service to the sub tuner 4. Further, the data service control unit 93 notifies the sub tuner processing control unit 90 that the data service reception has been completed.

Further, the data service control unit 93 also performs a process of acquiring the decoded data about the data service, the data being generated from the signal outputted by the main tuner 3, from the data service decoding unit 51, and causing the storage unit 10 to store the data.

As mentioned above, the sub tuner 4 is controlled by the control unit 9, to perform well-known processes which are a broadcast program search, alternative station channel selection, and data service reception.

The mode switching control unit 94 outputs a control signal to the D/A converting unit 6, to cause the D/A converting unit 6 to switch data which is a target for processing between the audio data outputted by the decoding unit 5 and other audio data, i.e., audio data outputted by an audio source other than DAB. The audio source other than DAB is, for example, a playback device for a Compact Disc (CD) or the like, a Frequency Modulation (FM) radio receiver, or the like. Although these audio sources are connected to the D/A converting unit 6 in such a way that they can communicate with the D/A converting unit 6, they are not illustrated in FIG. 1.

When the audio data outputted by the decoding unit 5 is the target for processing of the D/A converting unit 6, radio audio of DAB is outputted from the audio output unit 8. In contrast, when audio data outputted by, for example, an FM radio receiver is the target for processing of the D/A converting unit 6, FM radio audio is outputted from the audio output unit 8.

Switching between the modes as mentioned above is performed, for example, through the user's input of an instruction via the input unit 11. Every time the mode switching control unit 94 switches between the modes, the mode switching control unit 94 causes the storage unit 10 to store information showing which mode has been set.

The input-output control unit 95 receives the user's instruction via the input unit 11. Each of the units of the control unit 9 is then notified of the user's instruction which has been received. The input-output control unit 95 also reads the data about the data service accompanying the program of the broadcast station currently being selected by the main tuner 3 from the storage unit 10, and generates a video signal and outputs this video signal to the video output unit 12.

Figure 2:
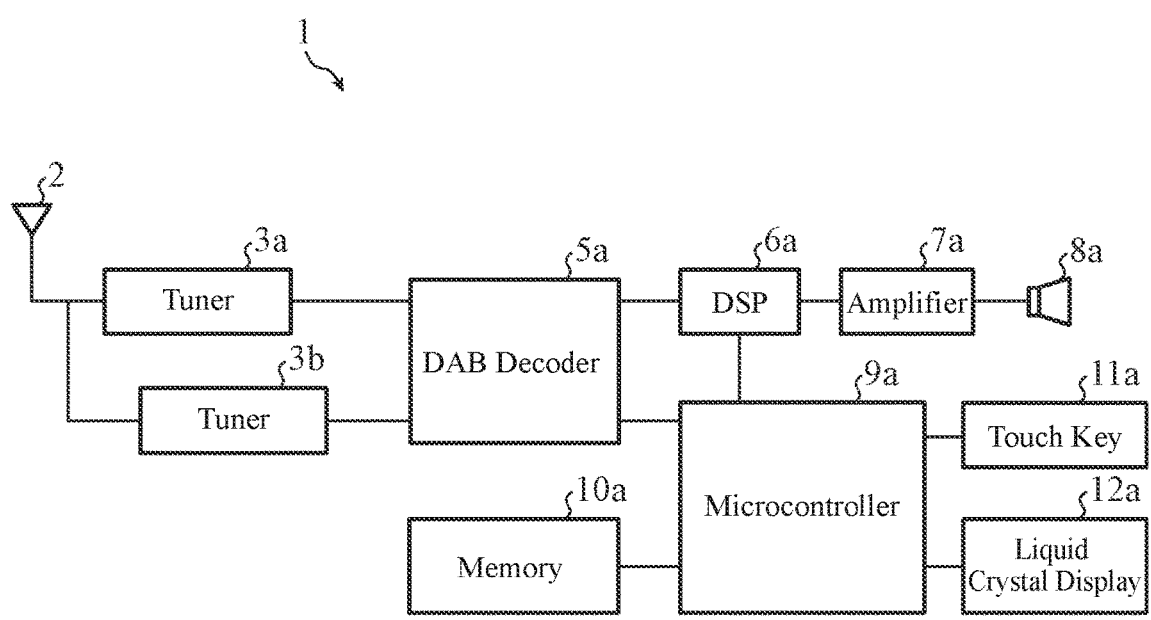
FIG. 2 is a diagram showing a hardware configuration example of the digital broadcast receiver according to Embodiment 1 of the present invention.

FIG. 2 is a diagram showing a hardware configuration example of the digital broadcast receiver 1.

The main tuner 3 and the sub tuner 4 include tuners 3*a* and 3*b* having the same reception function. One of the tuners 3*a* and 3*b* functions as the main tuner 3 and the other one of them functions as the sub tuner 4 under the control of the control unit 9. For example, while the tuner 3*a* functions as the main tuner 3 and the tuner 3*b* functions as the sub tuner 4, when an instruction to perform switching between the main tuner and the sub tuner is provided by the alternative switching control unit 92, the tuner 3*b* functions as the main tuner 3 and the tuner 3*a* functions as the sub tuner 4.

The decoding unit 5 includes a DAB decoder 5*a*.

The D/A converting unit 6 includes, for example, a Digital Signal Processor (DSP) 6*a*.

The amplifying unit 7 includes an amplifier 7*a*.

The audio output unit 8 includes a speaker 8*a*.

The control unit 9 includes, for example, a microcontroller 9*a*.

The storage unit 10 includes a memory 10*a* which is any type of memory. Concretely, the storage unit is configured, like a memory 101 mentioned later.

The input unit 11 includes, for example, a touch key 11*a* such as a touch panel.

The video output unit 12 includes, for example, a liquid crystal display 12*a*.

Other hardware configuration examples of the control unit 9 will be explained using FIGS. 3A and 3B.

Each of the functions of the sub tuner processing control unit 90, the broadcast program search control unit 91, the alternative switching control unit 92, the data service control unit 93, the mode switching control unit 94, and the input-output control unit 95 of the control unit 9 is implemented by a processing circuit. The processing circuit can be hardware for exclusive use, or a Central Processing Unit (CPU) that executes a program stored in a memory. The CPU is also referred to as a central processing device, a processing device, an arithmetic device, a microprocessor, a microcomputer, a processor, or a Digital Signal Processor (DSP).

Figure 3A:
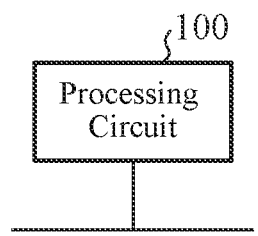
FIGS. 3A and 3B are diagrams each showing another hardware configuration example of a control unit of the digital broadcast receiver according to Embodiment 1 of the present invention.

FIG. 3A is a diagram showing an example of the hardware configuration in a case of implementing the function of each of the units of the control unit 9 by using a processing circuit 100 which is hardware for exclusive use. The processing circuit 100 is, for example, a single circuit, a composite circuit, a programmable processor, a parallel programmable processor, an Application Specific Integrated Circuit (ASIC), a Field Programmable Gate Array (EPGA), or a combination of two or more thereof. The functions of the sub tuner processing control unit 90, the broadcast program search control unit 91, the alternative switching control unit 92, the data service control unit 93, the mode switching control unit 94, and the input-output control unit 95 can be implemented by a combination of two or more processing circuits 100, or the functions of the units can be implemented by a single processing circuit 100.

Figure 3B:
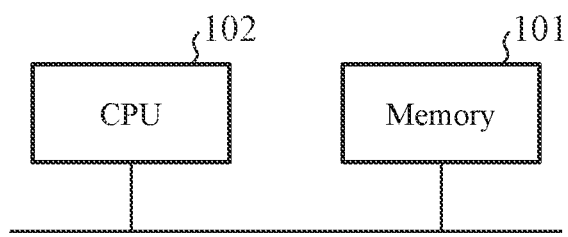

FIG. 3B is a diagram showing an example of the hardware configuration in a case of implementing the function of each of the units of the control unit 9 by using a CPU 102 which executes a program stored in the memory 101. The memory 101 can constitute the storage unit 10. In this case, the functions of the sub tuner processing control unit 90, the broadcast program search control unit 91, the alternative switching control unit 92, the data service control unit 93, the mode switching control unit 94, and the input-output control unit 95 are implemented by software, firmware, or a combination of software and firmware. Software and firmware are described as programs and the programs are stored in the memory 101. The CPU 102 implements the function of each of the units of the control unit 9 by reading and executing the program stored in the memory 101. More specifically, the control unit 9 has the memory 101 for storing programs or the likes by which each of steps shown in a flowchart of FIG. 7 mentioned later is performed as a result. Further, it can also be said that these programs cause a computer to execute a procedure or a method which each of the units of the control unit 9 uses. Here, the memory 101 is, for example, a non-volatile or volatile semiconductor memory, such as a RAM, a ROM, a flash memory, an Erasable Programmable ROM (EPROM), and an Electrically Erasable Programmable ROM (EEPROM), a magnetic disc, a flexible disc, an optical disc, a compact disc, a mini disc, a Digital Versatile Disc (DVD), or the like.

A part of the functions of the units of the control unit 9 can be implemented by hardware for exclusive use, and another part of the functions can be implemented by software or firmware. For example, the functions of the broadcast program search control unit 91, the alternative switching control unit 92, and the data service control unit 93 can be implemented by a processing circuit as hardware for exclusive use, and the functions of the sub tuner processing control unit 90, the mode switching control unit 94, and the input-output control unit 95 can be implemented by a processing circuit's reading and executing a program stored in the memory.

As mentioned above, the processing circuit can implement each of the above-mentioned functions of the control unit 9 by using hardware, software, firmware, or a combination of two or more thereof.

Next, an example of the processing by the digital broadcast receiver 1 constituted as above will be explained using timing charts shown in FIGS. 4 to 6.

First, an explanation will be made using FIG. 4. As shown in FIG. 4, in the main tuner 3, for example, a broadcast station B is selected, and reception of the audio of a program of the broadcast station B and reception of the data service of the program are performed. The program of the broadcast station B is currently being provided for the user from the audio output unit 8.

In the sub tuner 4, under the control of the control unit 9, a broadcast program search, alternative station channel selection, and data service reception are repeatedly performed in this order.

Further, the sub tuner processing control unit 90 monitors the reception levels of the main tuner 3 and the sub tuner 4, and the switching by the mode switching control unit 94 at all times while the digital broadcast receiver 1 operates.

The reception levels of the main tuner 3 and the sub tuner 4 can be monitored, via the decoding unit 5, by the sub tuner processing control unit 90, by providing, in the main tuner 3 and the sub tuner 4, well-known circuits or the likes each of which detects an electric field strength, a Signal to Noise Ratio (SNR), or the like which is an index of the reception level.

The switching by the mode switching control unit 94 can be monitored by the sub tuner processing control unit 90, by reading information stored in the storage unit 10.

Figure 4:
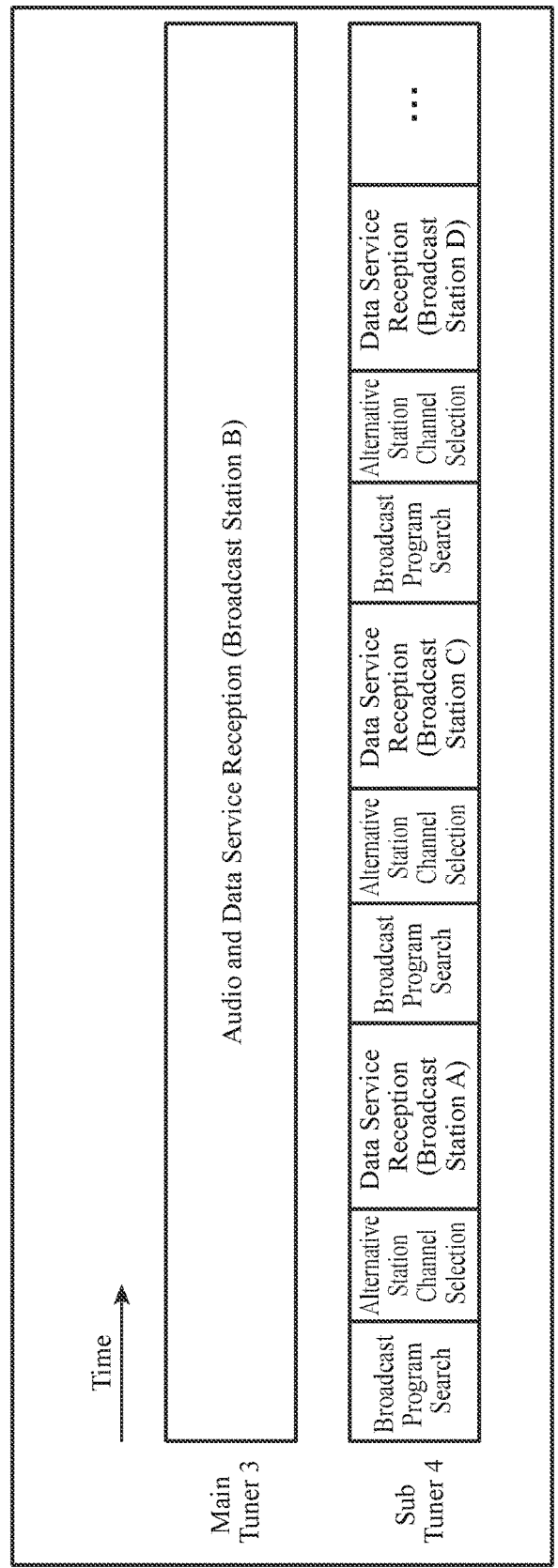
FIG. 4 is a timing chart showing processing of the digital broadcast receiver according to Embodiment 1 of the present invention.

The reason that after performing data service reception of a program of a broadcast station A, the sub tuner 4 performs data service reception of a program of a broadcast station C, instead of the broadcast station B, in the data service reception performed the next time, as shown in FIG. 4, is that the main tuner 3 has already performed the reception of the data service of the broadcast station B.

Next, an explanation will be made using FIG. 5. As shown in FIG. 5, the main tuner 3 and the sub tuner 4 perform the same processes as those in FIG. 4 until a time T1.

Then, when the reception level of the main tuner 3 becomes equal to or lower than a first threshold or the reception level of the sub tuner 4 becomes equal to or lower than a second threshold at the time T1 within a time period in which the sub tuner 4 is performing data service reception, the sub tuner processing control unit 90 decides to cause suspension of the data service reception which the sub tuner 4 is performing, and start of a broadcast program search. The broadcast program search control unit 91 and the data service control unit 93 are notified of this decision. Then, the sub tuner 4 suspends the data service reception currently being performed thereby and immediately starts a broadcast program search, in response to control signals from the broadcast program search control unit 91 and the data service control unit 93.

The first threshold is set to a value which shows that, for example, the user cannot hear the output audio of the audio output unit 8. More specifically, a state in which the reception level of the main tuner 3 is equal to or lower than the first threshold shows that the reception level has decreased to the degree that the user cannot hear the output audio. More specifically, because there is a possibility that the receivable programs change in this state, the necessity for broadcast program search is high.

Further, the second threshold is set to a value which shows that, for example, reception of data about data service cannot be performed. More specifically, a state in which the reception level of the sub tuner 4 is equal to or lower than the second threshold shows that the reception level has decreased to the degree that reception of data about data service cannot be performed. More specifically, because there is a possibility that missing of data about data service occurs in this state, the success rate of data service reception is low, and it is more efficient to switch to a broadcast program search.

In order to simplify the processing, only one threshold can be set up by setting the first threshold and the second threshold to the same value.

Then, during the state in which the reception level of the main tuner 3 is equal to or lower than the first threshold or the reception level of the sub tuner 4 is equal to or lower than the second threshold, the sub tuner 4 is caused to repeatedly and continuously perform a broadcast program search by the sub tuner processing control unit 90 and the broadcast program search control unit 91. In the state in which the reception level of the main tuner 3 is equal to or lower than the first threshold or the reception level of the sub tuner 4 is equal to or lower than the second threshold, because there is a possibility that the receivable programs change, the necessity for broadcast program search is high, while because there is a possibility that missing of data about data service occurs, the success rate of data service reception is low. Therefore, when the above-mentioned state occurs, it is efficient to suspend data service reception having a low success rate and continuously perform a broadcast program search having a high degree of necessity at all times during the state. In this way, the digital broadcast receiver 1 implements an efficient broadcast program search, alternative station channel selection, and data service reception.

Then, at a time T2 when there occurs a state in which the reception level of the main tuner 3 exceeds the first threshold and the reception level of the sub tuner 4 exceeds the second threshold, so that the state in which the reception level of the main tuner 3 is equal to or lower than the first threshold or the reception level of the sub tuner 4 is equal to or lower than the second threshold is canceled, the sub tuner processing control unit 90 decides to cause the sub tuner 4 to start a process of performing, as one set, a broadcast program search, then alternative station channel selection, and then data service reception. The broadcast program search control unit 91, the alternative switching control unit 92, and the data service control unit 93 are notified of this decision. Then, the broadcast program search control unit 91, the alternative switching control unit 92, and the data service control unit 93 output control signals in such a way that the sub tuner 4 starts the process.

Because the sub tuner 4 is performing a broadcast program search at the time T2, alternative station channel selection is then performed when a search at each frequency within the band is completed in the broadcast program search currently being performed.

Figure 5:
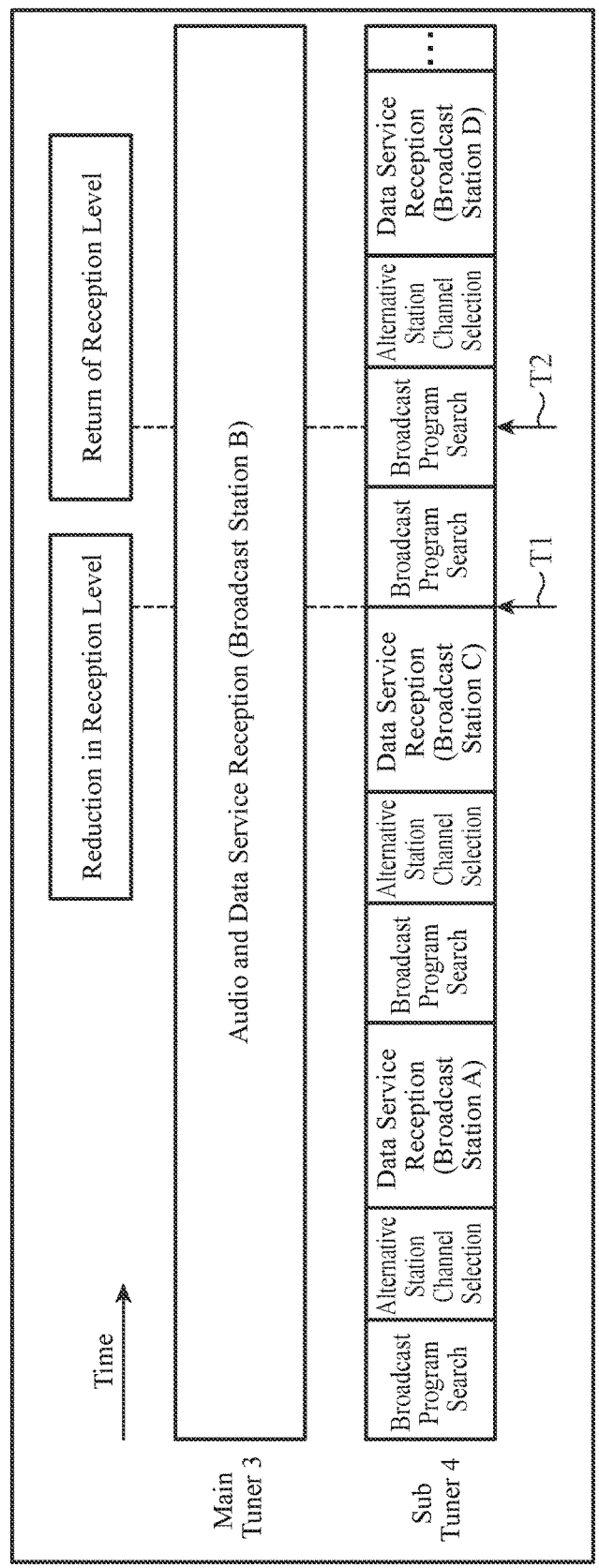
FIG. 5 is a timing chart showing the processing of the digital broadcast receiver according to Embodiment 1 of the present invention.

Further, in the example of FIG. 5, the data service reception suspended at the time T1 corresponds to a program of the broadcast station C. It is preferable to, after the time T2, postpone the reception of the data about the data service of the program by receiving the data again after reception of the data about the data service of another program shown in the program list. This is because it is expected that particularly when the reception level of the sub tuner 4 is equal to or lower than the second threshold, there is a higher possibility that there will occur a state in which the data service of the program of the broadcast station C can be received excellently at a time far from the time T1.

Further, even in a case in which it is determined that the reception level of the main tuner 3 is equal to or lower than the first threshold or the reception level of the sub tuner 4 is equal to or lower than the second threshold during data service reception in the sub tuner 4, the sub tuner processing control unit 90 decides to perform switching between the main tuner and the sub tuner when there occurs a state in which it has been clear that there is an alternative station as a result of a broadcast program search, the reception level of the main tuner 3 is equal to or lower than the first threshold, and the reception level of the sub tuner 4 is higher than the second threshold. The alternative switching control unit 92 is notified of this decision. Then, in response to a control signal from the alternative switching control unit 92, either of the tuners 3a and 3b which has been functioning as the main tuner 3 until that time functions as the sub tuner 4. At this time, the sub tuner processing control unit 90 decides to cause this sub tuner 4 to immediately start a broadcast program search. The broadcast program search control unit 91 is notified of this decision, and the broadcast program search control unit 91 causes the sub tuner 4 to start a broadcast program search.

As mentioned above, in the state in which the reception level of the main tuner 3 is equal to or lower than the first threshold or the reception level of the sub tuner 4 is equal to or lower than the second threshold during data service reception in the sub tuner 4, the control unit 9 controls the sub tuner 4 in such a way that the sub tuner 4 repeatedly and continuously performs only broadcast program search. By such control, an efficient broadcast program search, alternative station channel selection, and data service reception are made possible.

Next, an explanation will be made using FIG. 6. As shown in FIG. 6, the main tuner 3 and the sub tuner 4 perform the same processes as those in FIG. 4 until a time T3.

Figure 6:
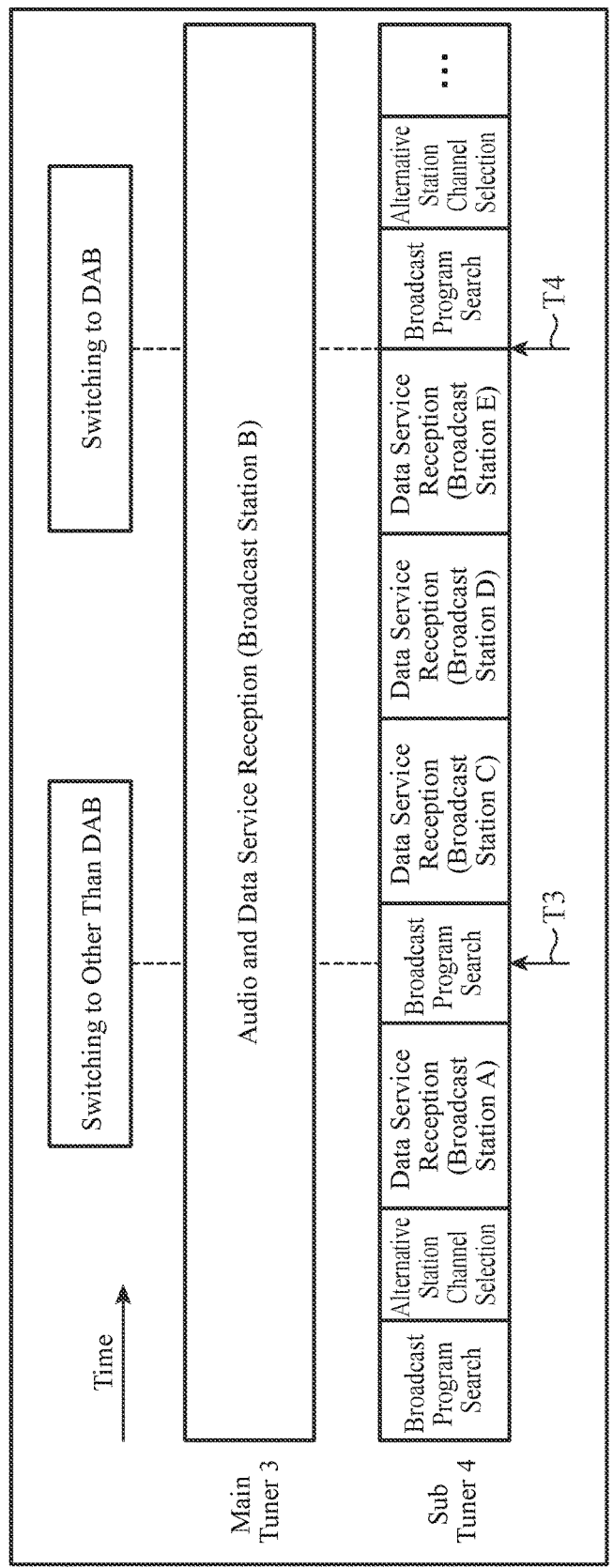
FIG. 6 is a timing chart showing the processing of the digital broadcast receiver according to Embodiment 1 of the present invention.

Then, at the time T3 when the mode switching control unit 94 switches the data which is the target for processing in the D/A converting unit 6 to audio data other than the audio data outputted by the decoding unit 5, that is, when the digital broadcast receiver 1 stops providing the user with the program of the broadcast station selected by the main tuner 3, the sub tuner processing control unit 90 decides to cause the sub tuner 4 to start a process of repeatedly continuing data service reception after the process currently being performed, i.e., in FIG. 6, after a broadcast program search. The broadcast program search control unit 91 and the data service control unit 93 are notified of this decision. Then, in response to control signals from the broadcast program search control unit 91 and the data service control unit 93, the sub tuner 4 starts the process of repeatedly continuing data service reception after completing the broadcast program search currently being performed.

Then, until a time T4 when the mode switching control unit 94 switches the data which is the target for processing in the D/A converting unit 6 to the audio data outputted by the decoding unit 5, the sub tuner 4 is caused to repeatedly and continuously perform data service reception by the data service control unit 93.

Then, at the time T4 when the mode switching control unit 94 switches the data which is the target for processing in the D/A converting unit 6 to the audio data outputted by the decoding unit 5, the sub tuner processing control unit 90 decides to cause the sub tuner 4 to suspend the data service reception currently being performed by the sub tuner and start a broadcast program search. The broadcast program search control unit 91 and the data service control unit 93 are notified of this decision. Then, in response to control signals from the broadcast program search control unit 91 and the data service control unit 93, the sub tuner 4 suspends the data service reception currently being performed thereby and immediately starts a broadcast program search.

At the time T3, the sub tuner processing control unit 90 causes the sub tuner 4 to start the process of repeatedly continuing data service reception after the process currently being performed, i.e., in FIG. 6, after a broadcast program search. This is because, due to the fact that a broadcast program search has a shorter time required to be completed after being started than that of data service reception, awaiting the completion of the broadcast program search causes few problems and it is preferable to rather complete an update of the program list. However, at this time T3, the sub tuner processing control unit 90 can alternatively cause the sub tuner 4 to suspend the process currently being performed by the sub tuner, i.e., in FIG. 6, a broadcast program search, and immediately start the process of repeatedly continuing data service reception. In either case, because the necessity for broadcast program search is low during the time period between T3 and T4 in which it is not necessary to provide the user with the program of the broadcast station selected by the main tuner 3, a higher priority is given to data service reception. Because data service reception requires a longer time than a broadcast program search and alternative station channel selection, the sub tuner 4 can be used efficiently after the time T4 by repeatedly performing data service reception as many times as possible during the time period between T3 and T4.

Further, the control unit 9 can perform the control in such a way that even the main tuner 3 performs data service reception during the time period between T3 and T4.

Further, also in the case shown in FIG. 6, when the reception level of the main tuner 3 is equal to or lower than the first threshold or the reception level of the sub tuner 4 is equal to or lower than the second threshold while the sub tuner 4 performs data service reception, the sub tuner processing control unit 90 decides to cause the sub tuner 4 to suspend the data service reception currently being performed by the sub tuner and start a broadcast program search. Then, during the state in which the reception level of the main tuner 3 is equal to or lower than the first threshold or the reception level of the sub tuner 4 is equal to or lower than the second threshold, the sub tuner 4 is caused to repeatedly and continuously perform a broadcast program search by the sub tuner processing control unit 90 and the broadcast program search control unit 91. In this case, it is preferable to postpone the reception of the data service of the program of the broadcast station, the reception having been suspended, by performing the reception again after reception of the data service of another program, like in the case shown in FIG. 5.

It is also expected that there is a possibility that switching to provide the user with a program of the broadcast station selected by the main tuner 3 is performed after the reception level of the main tuner 3 becomes equal to or lower than the first threshold. When this is taken into consideration, the necessity to suspend the data service reception and start a broadcast program search is high.

Further, in FIG. 6, at the time T4, the data service reception is suspended and a broadcast program search is started. However, if not even one data service reception has been completed until switching between processing modes in the D/A converting unit 6 is performed again at the time T4 after switching between the processing modes in the D/A converting unit 6 has been performed at the time T3, that is, in a case in which the time period between the time T3 and the time T4 is short, not much time elapses since the broadcast program search performed before the time T4. In this case, even though switching between the processing modes in the D/A converting unit 6 is performed again at the time T4, the control unit 9 can perform the control in such a way that the sub tuner 4 continues the data service reception.

As mentioned above, when the provision of the program of the broadcast station selected by the main tuner 3 for the user is stopped, the sub tuner 4 is controlled by the control unit 9 in such away as to perform data service reception on a priority basis. By such control, an efficient broadcast program search, alternative station channel selection, and data service reception are made possible.

Figure 7:
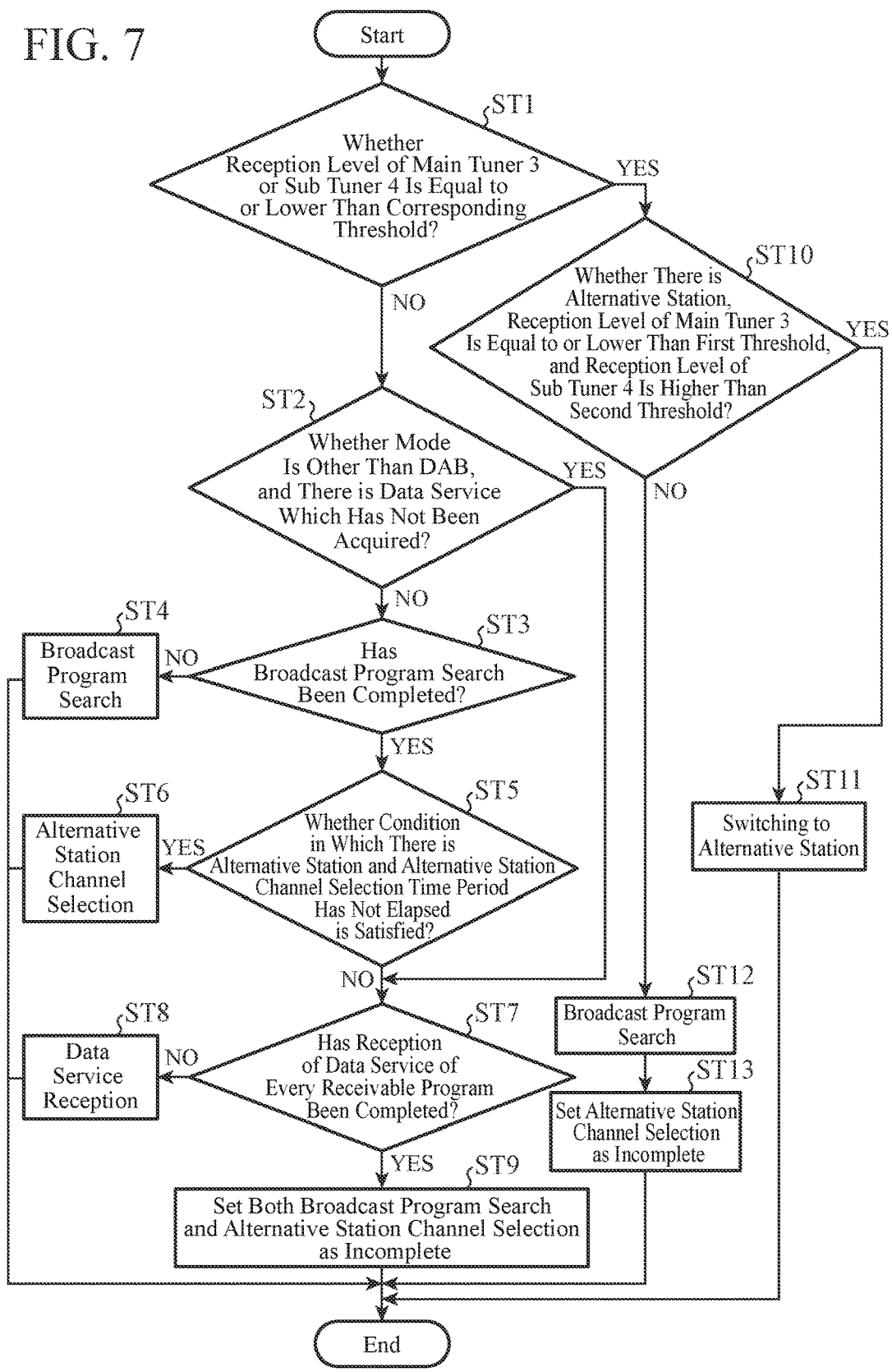
FIG. 7 is a flow chart showing the processing of the digital broadcast receiver according to Embodiment 1 of the present invention.

FIG. 7 is a flowchart showing an example of the processing by the digital broadcast receiver 1.

First, the sub tuner processing control unit 90 determines whether either the reception level of the main tuner 3 is equal to or lower than the first threshold or the reception level of the sub tuner 4 is equal to or lower than the second threshold (step ST1). When the reception level of the main tuner 3 is higher than the first threshold and the reception level of the sub tuner 4 is higher than the second threshold (NO in step ST1), the process proceeds to step ST2. The sub tuner processing control unit 90 then determines whether switching to a mode in which an audio source other than the DAB provided by the digital broadcast receiver 1 is provided has been performed, and there is a broadcast station whose data service has not been acquired (step ST2).

When switching to the mode in which an audio source other than the DAB is provided has been performed, and there is a broadcast station whose data service has not been acquired (YES in step ST2), the process proceeds to step ST7 mentioned later. This is made for the purpose of performing data service reception on a priority basis, and, in this case, neither determination of completion of a broadcast program search which is shown in step ST3 mentioned later, nor determination of the presence or absence of an alternative station, or the like which is shown in step ST5 mentioned later is performed.

In contrast, when switching to the mode in which an audio source other than the DAB is provided has not been performed, or there is no broadcast station whose data service has not been acquired (NO in step ST2), the sub tuner processing control unit 90 determines whether a broadcast program search has been completed (step ST3).

When a broadcast program search has not been completed (NO in step ST3), the sub tuner processing control unit 90 decides to cause the sub tuner 4 to perform a broadcast program search (step ST4). The sub tuner processing control unit 90 then sends a notification to that effect to the broadcast program search control unit 91. The broadcast program search control unit 91 then outputs a control signal to the sub tuner 4 in such a way that the sub tuner starts a broadcast program search or continues a broadcast program search when the broadcast program search has already been started, to cause the sub tuner 4 to perform the broadcast program search.

In contrast, when a broadcast program search has been completed (YES in step ST3), the sub tuner processing control unit 90 determines whether a condition in which there is an alternative station and the alternative station channel selection time period has not elapsed is satisfied (step ST5). The sub tuner processing control unit 90 can determine the presence or absence of an alternative station on the basis of service IDs, like the alternative switching control unit 92, or a notification showing the presence or absence of an alternative station can be sent from the alternative switching control unit 92 to the sub tuner processing control unit 90. In a state in which "the alternative station channel selection time period has not elapsed", both a state in which alternative station channel selection is not started, and a state in which the alternative station channel selection time period has not elapsed after start of alternative station channel selection are included.

When there is an alternative station and the alternative station channel selection time period has not elapsed (YES in step ST5), the sub tuner processing control unit 90 decides to cause the sub tuner 4 to perform alternative station channel selection (step ST6). The sub tuner processing control unit 90 sends a notification to that effect to the alternative switching control unit 92. The alternative switching control unit 92 then outputs a control signal to the sub tuner 4 in such a way that the sub tuner starts alternative station channel selection or continues alternative station channel selection when the alternative station channel selection has already been started, to cause the sub tuner 4 to perform the alternative station channel selection.

In contrast, when there is no alternative station or the alternative station channel selection time period has elapsed (NO in step ST5), the sub tuner processing control unit 90 determines whether the reception of the data service of every receivable program has been completed (step ST7).

When the reception of the data service of every receivable program has not been completed (NO in step ST7), the sub tuner processing control unit 90 decides to cause the sub tuner 4 to perform data service reception (step ST8). The sub tuner processing control unit 90 sends a notification to that effect to the data service control unit 93. The data service control unit 93 then outputs a control signal to the sub tuner 4 in such a way that the sub tuner starts data service reception or continues data service reception when the data service reception has already been started, to cause the sub tuner 4 to perform the data service reception.

In contrast, when the reception of the data service of every receivable program has been completed (YES in step ST7), the sub tuner processing control unit 90 sets both a broadcast program search and alternative station channel selection as incomplete (step ST9). In a case in which alternative station channel selection is incomplete, the time which has elapsed after start of alternative station channel selection is regarded as 0.

When the reception level of the main tuner 3 is equal to or lower than the first threshold or the reception level of the sub tuner 4 is equal to or lower than the second threshold (YES in step ST1), the process proceeds to step ST10. The sub tuner processing control unit 90 then determines whether there is an alternative station, the reception level of the main tuner 3 is equal to or lower than the first threshold, and the reception level of the sub tuner 4 is higher than the second threshold (step ST10).

When there is an alternative station, the reception level of the main tuner 3 is equal to or lower than the first threshold, and the reception level of the sub tuner 4 is higher than the second threshold (YES in step ST10), the process proceeds to step ST11. The sub tuner processing control unit 90 then decides to perform switching to the alternative station, i.e., cause the tuner which has been caused to operate as the main tuner 3 to operate as the sub tuner 4 and also cause the tuner which has been caused to operate as the sub tuner 4 to operate as the main tuner 3 (step ST11). The sub tuner processing control unit 90 sends a notification to that effect to the alternative switching control unit 92, to cause the alternative switching control unit 92 to control the switching between the main tuner and the sub tuner. At this time, the tuner which has served as the sub tuner 4 is controlled to start a broadcast program search by the sub tuner processing control unit 90 and the broadcast program search control unit 91.

When there is no alternative station, the reception level of the main tuner 3 is higher than the first threshold, or the reception level of the sub tuner 4 is equal to or lower than the second threshold (NO in step ST10), the sub tuner processing control unit 90 decides to cause the sub tuner 4 to perform a broadcast program search (step ST12). The sub tuner processing control unit 90 then sends a notification to that effect to the broadcast program search control unit 91. The broadcast program search control unit 91 then outputs a control signal to the sub tuner 4 in such a way that the sub tuner starts a broadcast program search or continues a broadcast program search when the broadcast program search has been already started, to cause the sub tuner 4 to perform the broadcast program search.

Next, the sub tuner processing control unit 90 sets alternative station channel selection as incomplete (step ST13).

The sub tuner processing control unit 90 repeatedly performs the series of processes shown in FIG. 7 as mentioned above at intervals, e.g., at intervals of 100 milliseconds.

A third threshold which is set to a reception level value higher than that of the first threshold can be provided, and the sub tuner processing control unit 90 can be configured so as to decide to perform the switching between the main tuner and the sub tuner when the reception level of the main tuner 3 becomes lower than the third threshold during alternative station channel selection by the sub tuner 4. Also in this case, the sub tuner 4 performs a broadcast program search after performing the switching, like in the above case. By doing in this way, switching to an alternative station can be performed seamlessly in a state in which the output audio of the audio output unit 8 is not so bad.

Further, the above explanation is made by taking, as an example, the case in which the digital broadcast receiver 1 receives a digital radio broadcast compliant with a DAB method. However, the digital broadcast receiver 1 can receive another digital radio broadcast such as a High Definition (HD) radio broadcast. As an alternative, the digital broadcast receiver 1 can receive a digital television broadcast. In this case, the digital broadcast receiver 1 is configured so as to decode not only audio data but also video data, and display a television picture on the video output unit 12.

To sum up, the digital broadcast receiver 1 receives a digital broadcast.

As mentioned above, in the digital broadcast receiver 1 according to Embodiment 1, the sub tuner 4 is controlled by the control unit 9 in such a way as to, when the reception level of the main tuner 3 is equal to or lower than the first threshold or the reception level of the sub tuner 4 is equal to or lower than the second threshold during data service reception by the sub tuner 4, suspend the data service reception and start a broadcast program search. Then, the sub tuner 4 is controlled by the control unit 9 in such a way as to repeatedly and continuously perform a broadcast program search during a state in which the reception level of the main tuner 3 is equal to or lower than the first threshold or the reception level of the sub tuner 4 is equal to or lower than the second threshold. By such control, an efficient broadcast program search, alternative station channel selection, and data service reception are made possible.

Further, when the provision of the program of the broadcast station selected by the main tuner 3 for the user is stopped, the sub tuner 4 is controlled by the control unit 9 so as to perform data service reception on a priority basis. By such control, a further efficient broadcast program search, alternative station channel selection, and data service reception are made possible.

It is to be understood that various changes can be made in any component according to the embodiment, and any component according to the embodiment can be omitted within the scope of the invention.

INDUSTRIAL APPLICABILITY

As mentioned above, because the digital broadcast receiver according to the present invention makes an efficient broadcast program search, alternative station channel selection, and data service reception possible, the digital broadcast receiver is suitable for being mounted in a vehicle or the like, and used as a receiver that receives a digital broadcast, such as DAB.

REFERENCE SIGNS LIST

1 digital broadcast receiver, 2 antenna, 3 main tuner, 3a and 3b tuner, 4 sub tuner, 5 decoding unit, 5a DAB decoder, 6 D/A converting unit, 6a DSP, 7 amplifying unit, 7a amplifier, audio output unit, 8a speaker, 9 control unit, 9a microcontroller, 10 storage unit, 10a memory, 11 input unit, 11a touch key, 12 video output unit, 12a liquid crystal display, 50 audio decoding unit, 51 data service decoding unit, 90 sub tuner processing control unit, 91 broadcast program search control unit, 92 alternative switching control unit, 93 data service control unit, 94 mode switching control unit, 95 input-output control unit, 100 processing circuit, 101 memory, and 102 CPU.

The invention claimed is:

1. A digital broadcast receiver for moving object comprising:
   two tuners, comprising a first tuner and a second tuner; and
   a control unit for performing control to, while causing the first tuner to select a first broadcast station broadcasting a current program currently being provided for a user, cause the second tuner to perform:
      a receivable program search to search for a receivable program,
      alternative station channel selection to select a second broadcast station broadcasting an alternative program as an alternative to the current program currently being provided for the user, or
      data service reception to receive data service of a receivable program,
   wherein, when there occurs a state in which a reception level of the first tuner is equal to or lower than a first threshold or a reception level of the second tuner is equal to or lower than a second threshold while the second tuner performs data service reception, the control unit causes the second tuners to suspend the data service reception and continuously perform a receivable program search during the state, and
   when the state is canceled, the control unit causes the second tuner to start a process of performing a receivable program search, then alternative station channel selection, and then data service reception.

2. The digital broadcast receiver for moving object according to claim 1, wherein, after the state is canceled and after data service reception of a first receivable program, the control unit causes the second tuner to perform data service reception of a second receivable program which has been caused to be suspended as a result of a state in which the reception level of the first tuner is equal to or lower than the first threshold or the reception level of the second tuner is equal to or lower than the second threshold.

3. A digital broadcast receiver for moving object comprising:
   two tuners, comprising a first tuner and a second tuner; and
   a control unit for performing control to, while causing the first tuner to select a first broadcast station broadcasting a current program currently being provided for a user, cause the second tuner to perform:
      a receivable program search to search for a receivable program,
      alternative station channel selection to select a second broadcast station broadcasting an alternative program as an alternative to the current program currently being provided for the user, or
      data service reception to receive data service of a receivable program,
   wherein when provision of the current a program of the first broadcast station selected by the first tuner for the user is stopped, the control unit causes the second tuner to continuously perform data service reception after a process currently being performed or after causing the second tuner to suspend the process, and
   when there occurs a state in which a reception level of the first tuner is equal to or lower than a first threshold or a reception level of the second tuner is equal to or lower than a second threshold while the second tuner performs data service reception, the control unit causes the second tuner to suspend the data service reception and continuously perform a receivable program search during the state.

4. The digital broadcast receiver for moving object according to claim 3, wherein, after the state is canceled and after data service reception of a first receivable program, the control unit causes the second tuner to perform data service reception of a second receivable program which has been caused to be suspended as a result of a state in which the reception level of the first tuner is equal to or lower than the first threshold or the reception level of the second tuner is equal to or lower than the second threshold.

\* \* \* \* \*